Nov. 10, 1959  D. C. GREEN  2,912,000
CHECK VALVES
Filed April 20, 1956  2 Sheets-Sheet 2

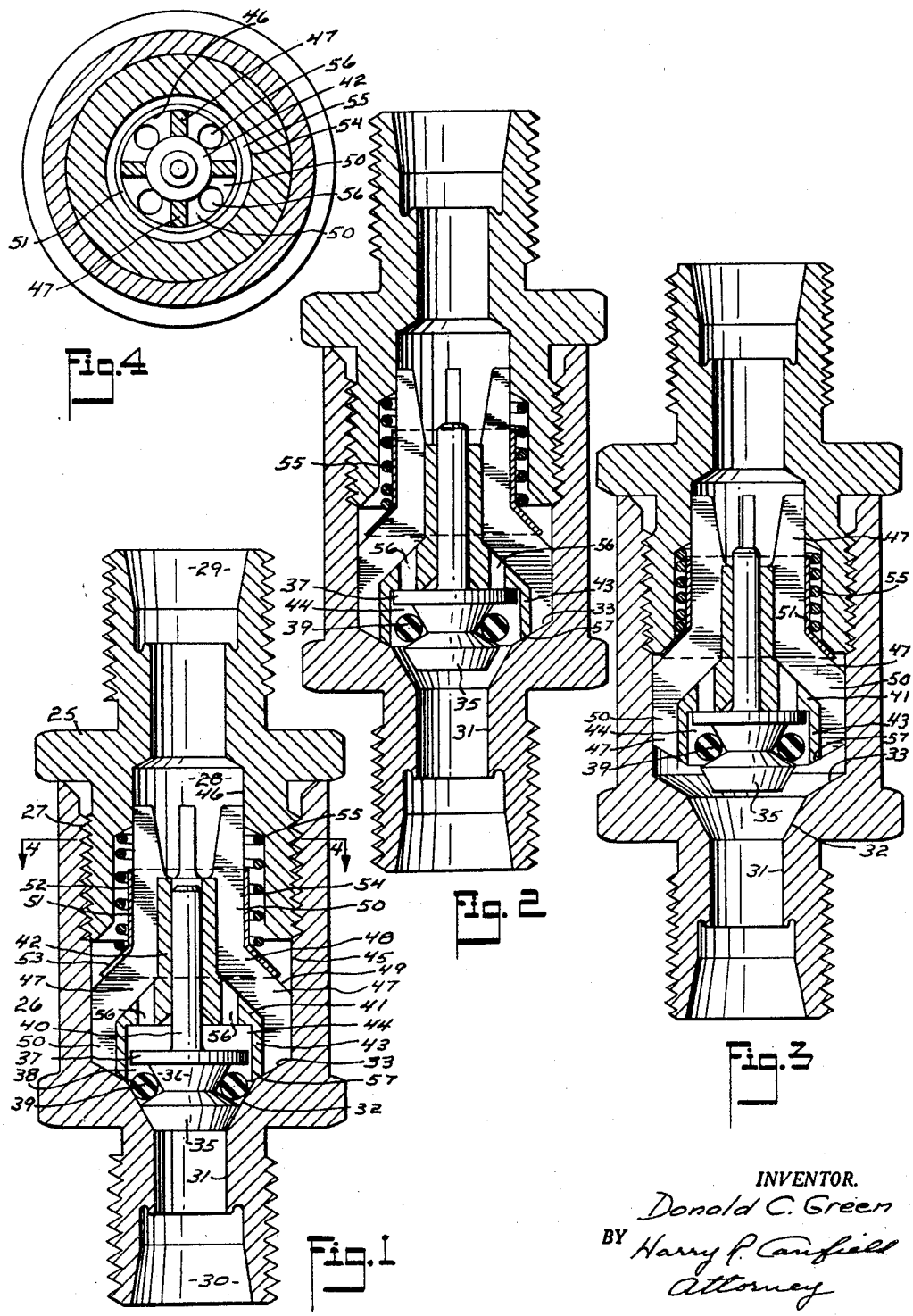

INVENTOR.
Donald C. Green
BY Harry P. Canfield
attorney

United States Patent Office 2,912,000
Patented Nov. 10, 1959

2,912,000

CHECK VALVES

Donald C. Green, Russell, Ohio

Application April 20, 1956, Serial No. 579,503

6 Claims. (Cl. 137—515.5)

This invention relates to valve devices for controlling the flow of fluid, and relates particularly to check valve devices of the type that comprise a valve port and a valve to open the port to permit flow therethrough in forward direction, and to close the port to prevent flow in backward or reverse direction.

In some check valve devices of this class a valve is provided to fit upon a valve port seat, to close the valve port, and cut off the flow but is not expected to absolutely seal the port, and an O-ring of rubber or the like is provided for sealing purposes.

When such valve devices as ordinarily made, operate to open the port and unseal the O-ring, the flow of fluid through the port impinges on the O-ring. In many cases the flow is at such high velocity that, in the absence of countervailing provisions, it will mutilate the O-ring or even tear it out of its mounting.

In my Patent No. 2,481,482 is described, a check valve of this type in which the O-ring is mounted in such manner that when the fluid flow first impinges on it, it is moved thereby to a position in which the fluid no longer impinges directly upon it, and the effect of the impingement is reduced so materially, that in many fields of use, this check valve has operated satisfactorily over long periods of time without damage to the O-ring or deterioration of the sealing effectiveness thereof.

O-rings for such check valves are for varying reasons made from synthetic rubber. Silicone rubber has properties which make it superior material for O-rings particularly in cases in which the fluid is such as would act chemically on other ring material; for example oxidation of the ring when the fluid is oxygen. But silicone O-rings are physically fragile and when the fluid flows through the valve at high pressure its velocity, if it contacts the O-ring, may break it or otherwise destroy its sealing usefulness.

The problem is thus presented, solved by the present invention, of devising a check valve the uses of which are not limited by nor dependent upon the physical strength of the ring material, so that there may be a free choice of a ring material best adapted to the characteristics of the fluid to be controlled.

Also, most synthetic materials for check valve O-rings deteriorate with time, and this reduces the physical strength of the O-ring; so that in certain installations such as those of the U.S. Air Force, a regular time schedule is followed for replacement of the O-ring.

The solution of said problem, by the present invention, by rendering the functioning of the O-ring independent of its physical strength, greatly lengthens the useful life of the check valve before replacement becomes expedient.

The check valve of the present invention may be considered as an improvement over that of said patent, in that it provides a more complete protection of the O-ring from the effects of fluid at high velocity flowing through the valve when it opens.

An object of the invention is to provide in a check valve, improved protection of the O-ring in the respects referred to.

Again, in check valves of this general class in which a coiled compression spring is used to normally hold the valve closed, it has been found that if the forward flow when the valve opens is at a very high velocity, and if it impinges or flows over or through the spring, it will in some cases displace or distort or mutilate the spring, or otherwise interfere with its intended action.

It is therefore another object of the invention to provide a check valve of the class referred to having a valve closing spring, in which the spring is disposed so as to be entirely out of the path of flow through the valve.

The embodiment of the invention described hereinafter, comprises in general the following, the actual invention being that set forth in the appended claims.

A valve is provided, comprising two elements, one a primary element to close and open the valve port, and the other an O-ring element to seal it. Assuming that the port is closed and sealed by the respective elements and that flow pressure occurs to open the valve port, the O-ring element breaks the seal but leaves the port still closed, and leaving the flow shut off by the primary element, and the O-ring moves into the open end of a tubular guard and is surrounded by it.

Then the primary element moves to open the port, and flow through the port has no flow path into the tubular guard but is directed over the outside of it and does not impinge upon or flow over the O-ring within it. The full protection of the O-ring, one of the primary purposes of the invention, is thus accomplished.

The primary valve element is held in the open-port position by the forward flow, against the force of a spring. Upon the occurrence of back flow and closing of the port, the force of the forward flow first dies out and the spring moves the primary element to close the port before any considerable back flow can develop and therefore whether or not the O-ring element remains within and guarded by the tubular guard until after the port is closed, is immaterial.

Another object of the invention is to provide a check valve construction comprising means having the mode of operation described, generally, above.

The invention is fully disclosed in the following description taken in connection with the accompanying drawing in which:

Figs. 1, 2 and 3 are longitudinal sectional views of an embodiment of the invention, showing parts thereof in different positions;

Fig. 4 is a cross sectional view taken from the plane 4—4 of Fig. 1;

Figure 6:
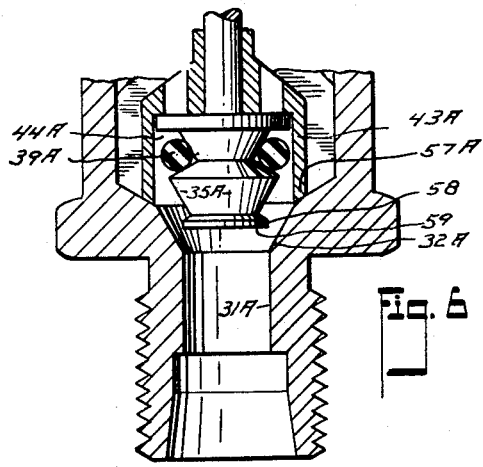
Figs. 5, 6 and 7 are views similar to Figs. 1, 2 and 3, respectively, showing a modification.

Referring to the drawing Figs. 1 to 4 there is shown a housing comprising an upper part 25 and a lower part 26 threaded together at 27; and in general a passageway 28 therethrough, the upper and lower ends 29 and 30 of which are formed for coupling conduits thereto.

The lower end 30 of the main passageway communicates with a valve port 31 and a conical port seat 32. The conical port seat 32 at its upper termination continues into an annular surface 33 which preferably is conical.

A valve structure is provided having a valve head 35 of conical form which seats upon a lower portion of the conical port seat 32. The valve head 35 is connected by a conical downwardly converging neck 36 to an enlarged diameter flange 37 thereby providing a groove 38 between the valve head 35 and the flange 37, in which is seated a sealing O-ring 39 of sectional diameter large enough to extend outwardly slightly beyond the periphery of the conical valve head 35.

Coaxial with the valve head 35 is a stem 40 extending upwardly from the flange 37.

A cage 41 is provided comprising a tubular part 42 to receive the stem 40 therein and in which the stem is reciprocably mounted.

The lower end of the tubular part 42 of the cage is of enlarged diameter and terminates in a tubular skirt 43 depending therefrom, the skirt thus providing a downwardly open recess 44 in the cage.

The lower end 57 of the skirt 43 is engageable upon and disengageable from the said annular surface 33 to function as a valve to be described.

The cage is reciprocable in the two part housing, as follows.

The lower part 26 of the housing has an interior cylindrical wall 45 of larger diameter than the said cage skirt 43. The upper part 25 of the housing has an interior cylindrical wall 46 smaller in diameter than the cylindrical wall 45 but larger in diameter than the tubular part 42 of the cage.

Radial ribs 47 are provided extending longitudinally of the skirt 43 and tubular part 42 of the cage, the upper portions of the ribs slidingly fitting the cylindrical surface 46 and their lower portions slidingly fitting the cylindrical surface 45, and the upper and lower portions of the ribs continue into each other at inclined rib portions 48 thus providing inclined shoulders 49 on the ribs.

The spaces between adjacent ribs 47 provide longitudinal flow passages 50 on the outside of the tubular part 42 and the outside of the skirt 43.

A funnel shaped shroud 51 is provided having a tubular upper portion 52 telescoped over the upper portion of the ribs, and a conical or outwardly flared lower portion 53 engaged upon the said inclined rib shoulders 49.

The cylindrical surface 46 of the upper housing part 25 is enlarged in diameter at a lower portion thereof providing an annular recess 54 around the upper parts of the ribs 47; and a coiled compression spring 55 is disposed in this recess abutting at its lower end upon the conical portion 53 of the shroud 51 thus exerting downward spring force on the cage ribs 47 and therefore on the whole cage 41. The spring 55 as shown is telescoped over the tubular part 52 of the shroud 51.

The interior of the skirt 43 above the flange 37 of the valve structure communicates with the passages 50 between the cage ribs by ducts 56.

In Fig. 1, which shows the parts functioning as a check valve, the cage 41 is held down by the spring 55 so that the lower end 57 of the tubular skirt is engaged upon the surface 33. When back pressure appears in the upper end 29 of the main passageway it is communicated to the cage as a whole; and to the upper end of the stem 40; and through the ducts 56 to the upper side of the flange 37.

The lower end 57 of the skirt 43 is thus held in firm contact with the surface 33; and the conical valve head 35 is held upon the port seat 32. Back pressure flow is thus cut off.

Also the rubber O-ring 39 is held down upon the conical port seat 32 and seals the port, by pressure on it through the ducts 56 and around the flange 37, clearance around the flange 37 being provided for this purpose.

When forward flow pressure appears at the lower end 30 of the housing and back pressure disappears or is overcome by the forward pressure, the forward pressure is first communicated only to the conical valve head 35 and raises it from the port seat 32. This raises also the O-ring 39 and flange 37 and stem 40, the cage continuing to be held down by the spring 55, and the end 57 of the skirt 43 continuing to be held on the surface 33.

The parts will thus at first move to the positions of Fig. 2. Main flow is still cut off by the cage skirt 43 on the surface 33; acting as a valve.

The O-ring has now moved upwardly into the said recess 44 within the tubular skirt 43 and is surrounded by the skirt; and the flange 37 has moved upwardly and overlaps and closes the ducts 56 and stops said upward movement of the valve parts.

When the upward movement of the valve parts just described ceases, the forward pressure becomes effective to raise the cage against the force of the spring 55, and the valve parts with it, and the parts then go to the positions of Fig. 3.

The skirt 43 is now elevated above the said surface 33.

Forward flow can now occur through the port 31 and port seat 32, laterally and under the lower end 57 of skirt 43 upwardly through the flow passages 50 between the ribs 47 and out at the upper end 29 of the housing.

There is no path for forward flow inside of the skirt 43 and since the O-ring moved up into the skirt and was surrounded by it before forward flow began it is wholly protected from the effects of flow impinging on it; and the main object of the invention is thus accomplished.

When forward flow ceases or is no longer able to hold the cage 41 up against the force of the spring 55 the spring returns the cage downwardly, closing the flow path at the end 57 of the skirt, and the valve parts return to the position of Fig. 1.

The lower end 57 of the skirt 43 and the annular surface 33 engaged and disengaged thereby; constitute the primary valve to open and close the port 31. The conical head 35 and the conical port seat 32 while having the appearance of a valve and valve seat are not intended to operate as a valve, but are for the following purpose. When the valve is closed as a check valve, and as in Fig. 1, the O-ring is subjected to the back pressure on its upper side, as described, it will be compressed by the back pressure and if there is any crack or crevice adjacent to it, it will be extruded into such crack or crevice and thereby mutilated. The provision of the surfaces 32 and 35 both conical at the same angle is the most convenient way to close the underside of the O-ring groove 38 without a crack or crevice under the O-ring.

The spring 55 will be seen to be laterally outside of the path of flow, which is through the passages 50 between the ribs 47 of the cage, the funnel form shroud 51 providing a barrier or flow deflector between this path of flow and the spring, as plainly shown in the drawing. The spring is therefore protected against distortion and damage due to impingement of fluid flow upon or through it, as referred to in the premises.

Figure 5:
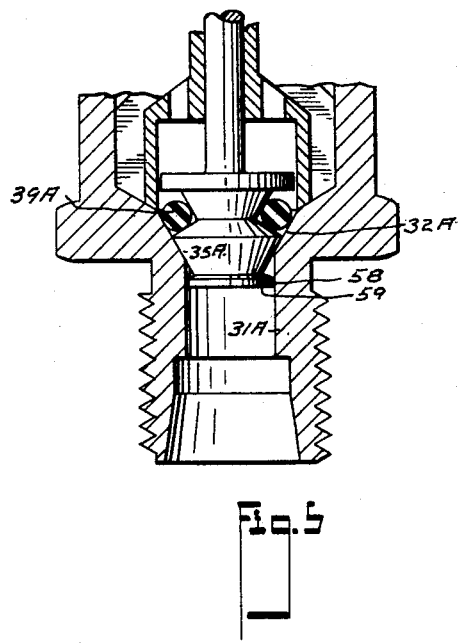
Figure 7:
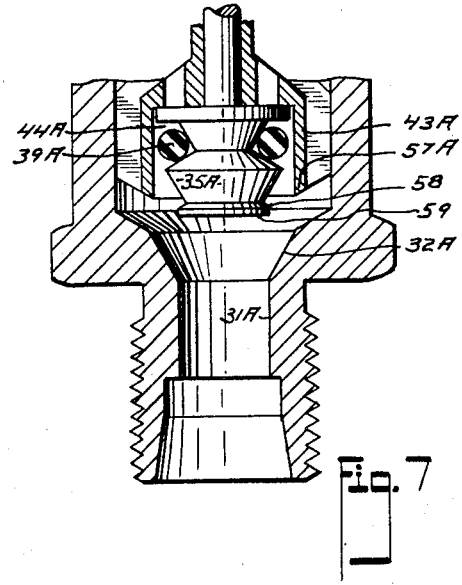

In Figs. 5 to 7 is shown a modification of the conical valve head 35 of Figs. 1 to 4, by which when the valve moves up as in Fig. 3, and the O-ring 39 enters the recess 44, the O-ring will be more forcibly and securely held all the way up in the recess; and to insure that the upward flow will be more effectively deflected laterally away from the recess and not impinge upon the O-ring.

Parts in Figs. 5, 6, and 7 that correspond to parts in Figs. 1 to 4 are given the same reference characters with the suffix A to identify them and shorten the description.

In Figs. 5 to 7, a disc or disc-like formation 58 is provided on the lower end of the conical valve head 35A preferably filling the port 31A with clearance, below the conical port seat 32A; and having a flat transverse face 59 on its underside.

Fig. 5 illustrates the parts in valve closed condition as described for Fig. 1, where as seen the disc 58 is in the port 31A.

When forward flow occurs, the inner valve parts including the O-ring 39A, move to the position of Fig. 6 as described for Fig. 2, in which flow through the valve port 31A is still cut off by the end of the main valve skirt 43A; and the O-ring 39A has moved up into the recess 44A of the main valve.

The upward movement of the inner valve parts to this position, is rendered positive by the forward pressure acting on the transverse flat face 59, initiated while it is still in the port 31A.

The disc 58 is now, Fig. 6, somewhat above the port 31A, whereby forward flow pressure on the flat face 59 holds the inner valve parts at their extreme upper position.

Forward pressure now moves the parts to the position of Fig. 7 as described for Fig. 3; the main valve skirt 43A of Fig. 7 moving upwardly, to open the valve at the lower end 57A of the skirt, and the valve parts within the recess 44A moving in unison with it.

The disc 58 is now well above the port 31A and a free flow path is present, through the port 31A, around and over the periphery of the disc 58 and under the skirt end 57A etc.

This flow, coming from the port 31A impinges directly upon the flat face 59 of the disc 58, and is deflected laterally thereby into the flow path referred to; and therefore exerts a strong upward force on the disc and on the valve parts above it, holding them, including the O-ring in their extreme upward position, with the ring in the upper part of the recess and entirely out of the flow path, for the purposes of the invention in the premises.

Operation is improved by the presence of the disc 58 and its flat under face 59, as follows.

The disc 58 as shown is larger in diameter than the lower termination of the conical valve head 35A above it, and the forward flow has thereforce increased area to impinge upon to hold the inner valve parts in the upper position. Also, the flow laterally to the periphery of the disc, as in Fig. 7 and then upwardly over the edge of the disc toward the skirt end 57A, causes turbulence at the disc peripheral edge to occur, and this itself exerts an upward component of force on the disc and its connected valve parts, which is added to that caused by said impingement.

The disc 58 may be formed integrally with the head 35A, or attached to it in any suitable manner.

The invention is not limited to the exact details of construction shown and described. Changes and modifications may be made by those skilled in the art and the invention is comprehensive of all such changes and modifications that come within the scope of the appended claims.

This application is a continuation-in-part of the subject matter of my application Serial No. 499,111, filed April 4, 1955.

I claim:

1. A check valve device comprising a walled housing, which in a position of use has upper and lower openings for connection to flow conduits; a valve port in the housing between the openings; a first valve element in the housing, movable downwardly and upwardly to cut off and permit flow through the port; a spring urging the first valve element to move downwardly; a second valve element in the housing carrying a sealing element and movable by back pressure from the upper opening to seal the port, and upwardly by forward presure from the lower opening to unseal it; the first valve element having a walled recess above the sealing element; the sealing element being movable into the recess and surrounded by the recess wall upon upward movement of the second valve element; the first valve element being subjected to the said forward pressure through the unsealed port and movable thereby upwardly against the spring force, to permit flow through the port; and the forward flow holding the second valve element upwardly and maintaining the sealing element in the recess surrounded by the recess wall.

2. A check valve device comprising a walled housing which in a position of use has upper and lower openings for connection to flow conduits; a valve port opening into the housing between the openings; a first valve elen in the housing movable downwardly and upwardly having a lower valve portion arranged to cut off 1 through the port upon downward movement and a spi tending to move it downwardly; a downwardly o walled recess in the lower valve portion; a second va element in the housing movable upwardly and do wardly, and carrying a sealing element; which u downward and upward movement seals and unseals port; the second valve element being held downwai by back flow pressure from the upper opening and n able upwardly by forward flow pressure in the port fi the lower opening; the second valve element upon ward movement carrying the sealing element up, i the recess of the first valve element in position to surrounded by the recess wall; the first and second vi elements being subjected to forward flow pressure u unsealing of the port and being movable together wardly thereby, the upward movement of the first vi element allowing forward flow to occur through port; the forward flow holding both valve elements wardly and thereby holding the sealing element in recess.

3. The valve device described in claim 2 and in wh the second valve element has a head below the seal element, and the forward flow holds it upwardly by pinging on the head, and the head deflects the flow la ally away from the downwardly open recess.

4. The valve device described in claim 3 and in wh the port is of conical form, and the lower valve port of the first valve element engages and disengages ripheral portions of the port; and the sealing elemen of annular form mounted in a neck on the second va element above its head; and the sealing element se the port by pressure engagement with the conical port ; the neck, effected by means communicating back pi sure to the sealing element from the upper opening wl the second valve is in the downward position.

5. The valve device described in claim 2 and in wh the port is of conical form, and the second valve ( ment has a conical head on its lower portion; and conical head fits the conical port when the second va element is in downward position; and a disk like forr tion is provided on the lower end of the second va element below the conical head and of greater diame than the said lower end, and the second valve elem upon upward movement carries the sealing element into the recess in position to be surrounded by the rec wall; and the second valve element is held in upw position by forward flow impinging on the disk like f mation and is thereby deflected laterally away from  downwardly open recess.

6. The valve device described in claim 2 and in wh the sealing element is of annular form and the seco valve element has a head below the sealing element, a the head at its lower end has a portion of enlarged dia eter, and the forward flow holds the valve element  wardly by impinging on the enlarged diameter porti and the enlarged diameter portion deflects the flow lat ally away from the downwardly open recess.

References Cited in the file of this patent

UNITED STATES PATENTS

| 1,252,940 | Osborne | Jan. 8, 19 |
| 2,481,482 | Green | Sept. 13, 19 |
| 2,488,075 | Bridwell | Nov. 15, 19 |
| 2,595,012 | Smith | Apr. 29, 19 |
| 2,666,614 | Grove | Jan. 19, 19 |
| 2,720,219 | Grove | Oct. 11, 19 |